US008544069B1

(12) United States Patent
Subbiah et al.

(10) Patent No.: US 8,544,069 B1
(45) Date of Patent: Sep. 24, 2013

(54) METHODS SYSTEMS AND ARTICLES OF MANUFACTURE FOR IMPLEMENTING USER ACCESS TO REMOTE RESOURCES

(75) Inventors: Thirugnanam Subbiah, Mountain View, CA (US); Ken Hanscom, Westlake Village, CA (US)

(73) Assignee: Intuit Inc., Mountain View, CA (US)

( * ) Notice: Subject to any disclaimer, the term of this patent is extended or adjusted under 35 U.S.C. 154(b) by 113 days.

(21) Appl. No.: 13/097,723

(22) Filed: Apr. 29, 2011

(51) Int. Cl.
*G06F 7/04* (2006.01)
*G05B 19/00* (2006.01)

(52) U.S. Cl.
USPC .................................. 726/4; 340/5.8

(58) Field of Classification Search
USPC ................................ 726/4; 715/150; 340/5.8
See application file for complete search history.

(56) References Cited

U.S. PATENT DOCUMENTS

| | | | |
|---|---|---|---|
| 6,865,680 B1 * | 3/2005 | Wu et al. | 726/12 |
| 2002/0186249 A1 * | 12/2002 | Lu et al. | 345/781 |
| 2003/0061512 A1 * | 3/2003 | Flurry et al. | 713/201 |
| 2004/0111620 A1 * | 6/2004 | Saunders et al. | 713/182 |
| 2005/0055306 A1 * | 3/2005 | Miller et al. | 705/37 |
| 2005/0108546 A1 * | 5/2005 | Lehew et al. | 713/182 |
| 2006/0048214 A1 * | 3/2006 | Pennington et al. | 726/5 |
| 2006/0075224 A1 * | 4/2006 | Tao | 713/164 |
| 2006/0107217 A1 * | 5/2006 | Lu et al. | 715/733 |
| 2006/0230112 A1 * | 10/2006 | Henderson et al. | 709/206 |
| 2008/0313228 A1 * | 12/2008 | Clark et al. | 707/104.1 |
| 2010/0064355 A1 * | 3/2010 | Toomey et al. | 726/5 |
| 2010/0223558 A1 * | 9/2010 | Feng | 715/741 |
| 2011/0179270 A1 * | 7/2011 | Tewari et al. | 713/165 |
| 2012/0204249 A1 * | 8/2012 | Gonzalez et al. | 726/8 |

* cited by examiner

Primary Examiner — Techane Gergiso
(74) Attorney, Agent, or Firm — Vista IP Law Group LLP

(57) ABSTRACT

Methods, systems, and articles of manufacture for implementing user access to remote resources residing on an external domain. Various implementations include authenticating and authorizing a user on a first system and receiving user request to access remote resources. The first system invokes processes or modules to initiate a new session to perform auto logon on behalf of the user on a second system by using stored user's credentials and subdomain delegation techniques without user intervention. The second system authenticates and authorizes this new session to allow user access to remote resources residing thereupon. The first system further prepares the user's system to take over the new session by setting cookie(s) and also by redirecting the URL so the user may continue to use the new session to access the desired remote resources residing on the second system.

25 Claims, 13 Drawing Sheets

METHODS SYSTEMS AND ARTICLES OF MANUFACTURE FOR IMPLEMENTING USER ACCESS TO REMOTE RESOURCES

BACKGROUND

Embodiments of the invention relate to on-line account access. Users often have multiple online accounts that are used for various purposes. Each account may separately require different user credentials (e.g., usernames and various forms of passwords) in order to properly authenticate the user and to authorize the user to access various products or services offered by respective institutions of these accounts. For example, a user may have a banking account with a financial institution, a brokerage account with an investment banking institution, or any other online accounts for other purposes. It is often tedious to manage multiple online accounts with different usernames or passwords.

One known approach is to use a single-sign-on (SSO) approach which provides access control of multiple related, but perhaps independent systems by internally translating and storing different credentials for these multiple independent systems. SSO ensures that users do not actively have to enter their credential more than once by using centralized authentication server(s) that all these multiple related systems utilize for authentication purposes. In other words, with the SSO approach, the system enables a user to enter one username and one password to log on to a network once and thereby gain access to different systems or Web sites. A SSO approach may use, for example, a ticket-granting ticket (TGT) where the initial sign-on prompts the user for credentials and gets a TGT, and additional applications requiring authentication is provided with the user's identify and use the TGT to acquire service tickets without prompting the user to re-enter credentials. Another SSO approach uses the smart card based approach where the initial sign-on asks a user for a smart card identification (e.g., certificates or passwords stored on the smart card), and additional applications also use the smart card identification without asking the user to re-enter credentials. Another SSO approach with multi-factor authentication with security tokens (e.g., OTP tokens) uses the tokens to store software that allows for seamless authentication and password filling.

Although the SSO approaches do not require the user to enter credentials more than once, they involve server to server special communications and passing user credentials between the user's browser and multiple systems and thus pose greater risks of compromising the user's credentials by for example, replay attacks or eavesdropping. Some approaches use OAuth that allows users to handout tokens instead of credentials to their data where each token grants access to a specific site for specific resources for a defined duration. Some approaches use OpenID that describes how users may be authenticated in a decentralized manner. The OpenID architecture obviates the need for external systems to provide own ad hoc authentication systems and allows users to consolidate digital identities. Nonetheless, the SSO architecture, OAuth architecture, and the OpenID architecture involve custom development on the external systems hosting the remote resources.

Some known approaches use the thick client concept to simplify user's login to multiple independent systems to provide a user with a one-click access to these multiple independent systems. However, the thick client architecture or network typically provides rich functionality or even full functionality (e.g., the login functionality) independent of the central server. The thick-client architecture allows the client to be fully functional even in the absence of a network connection and thus presents a greater risk of compromising user's credentials because the thick client uses the independent login functionality at the thick client to automatically log the user onto different independent system.

SUMMARY

Disclosed are various embodiments relate to methods, systems, and articles of manufacture for implementing user access to remote resource including but not limited to software programs, applications, application suites, one or more processes, actions, or modules of a software program, application, or an application suite, products, services, information or data (hereinafter, "remote resource") that reside on an external domain.

In one or more embodiments, a method or system for implementing user access to remote resource includes the process or module for receiving a user request to access remote resource residing on a parent domain of an external system. The method or the system further comprises the processes or modules for performing automatic logon on behalf of the user by using stored user credentials using thin client approach, which comprises no logic on end-user's system, and a new session and preparing the user's system to take over and to continue to use the new session to access the remote resource in these embodiments. In some embodiments, the method or the system performs the automatic logon such that the user is authenticated and authorized on the external system without any intervention from the user. In some embodiments, the user's request to access the remote resource comprises only a single click on a link in the user's browser. In these embodiments, a user may click on an embedded link of a remote resource on a web page indicating the user's intent to access the remote resource, the method or the system responds to the user's request by performing various processes or invokes various modules to perform automatic logon on behalf of the user by using stored user credentials via a session between the system hosting the web page and the external system providing the remote resource. The method or the system may then prepare the user's browser to take over the session and further to continue the session to access the remote resource on the external system.

In some embodiments, the method or the system stores various user credentials for various remote resources at a central location such as, but not limited to, one or more databases. In these embodiments, the corresponding user credentials will be retrieved or identified by a process or module and then forwarded to an external domain upon which the remote resource that the user desires to access resides. One of the objectives is to avoid the transmission of user credentials for various remote resources between the user's system and the corresponding external systems hosting the remote resources to better safeguard the user credentials from, for example, eavesdropping, replay attacks, cookie theft, session hijacking, or any other means for compromising the user credentials.

In certain embodiments, the method or the system provides a user with a one click access to the remote resource by using a thin-client architecture without transmitting the user credentials between the use's browser or system and the external system hosting the remote resource. In certain embodiments, the method or the system implements user access to remote resources without any custom development on the external systems hosting the remote resources. In certain embodiments, the method or the system implements the user access to remote resources without any support for federated identity, the Oauth architecture, the OpenID architecture, or security tokens, and without any user intervention. Contrary to the SSO architecture, the method or the system implements the user access to remote resources without any special communications between a first system implementing the user access to remote access and an external system hosting the remote resource in certain embodiments.

Further details of various embodiments of the invention are described in the Detailed Description section with reference to respective figures.

BRIEF DESCRIPTION OF THE DRAWINGS

In order to better appreciate how to obtain the above-recited and other advantages and objects of various embodiments, a more detailed description of the inventions briefly described above will be rendered by reference to specific embodiments thereof, which are illustrated in the accompanying drawings. It should be noted that the drawings are not drawn to scale and that elements of similar structures or functions are represented by like reference numerals throughout. Understanding that these drawings depict only certain embodiments and are not therefore to be considered limiting of its scope, certain embodiments will be described and explained with additional specificity and detail through the use of the accompanying drawings in which:

FIG. 3A illustrates more details of a process or module illustrated in

FIG. 1 in certain embodiments.

DETAILED DESCRIPTION OF ILLUSTRATED EMBODIMENTS

Figure 1:
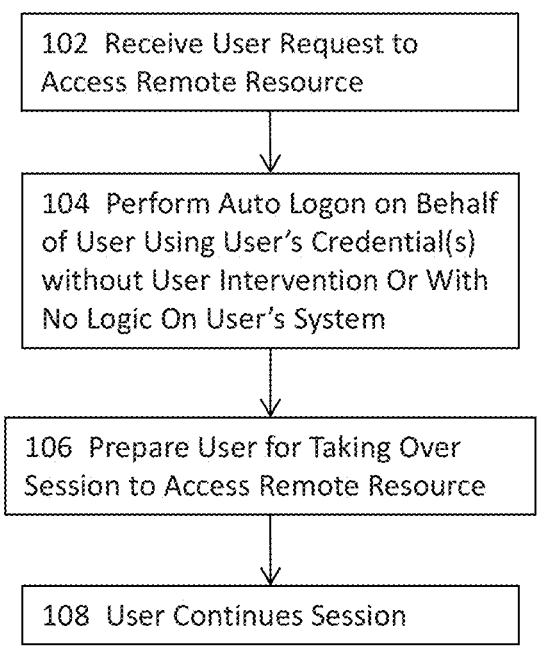
FIG. 1 illustrates a high level flow diagram of a method or system for implementing user access to remote resource in certain embodiments.

Various embodiments are directed to methods, systems, and computer program products for implementing user access to remote resources. FIG. 1 illustrates a high level flow diagram of a method or system for implementing user access to remote resource in certain embodiments. In one or more embodiments, the method or the system for implementing user access to remote resources comprises the process or module for receiving a user request to access a remote resource at 102. In certain embodiments, the user request to access the remote resource may comprise a user's clicking on an embedded link or a button in a Web page. In these embodiments, the embedded link or the button links to the remote resource that the user desires to access.

For example, the user may first visit a Web page presented to the user by the first system. The user may desire to access a remote resource by locating and clicking on a link or a button or selecting an item from a menu in the Web page. In some cases, the first system may provide such a link, button, or item as a product or service for registered users and thus requires proper authentication or authorization for the user on the first system first. The first system then performs various processes or invokes various modules to enable the user to access the desired remote resource.

The method or the system may comprise the process or module for performing automatic logon on behalf of the user by using user credentials at 104 in certain embodiments. In one or more embodiments, the method or the system initiates or identifies a new session between the first system that receives the user request and another system providing the remote resource for the automatic logon. In these embodiments, the user visits the Web page presented by the first system receiving the user request via a first session, and the first system initiates or identifies a second session to perform the automatic logon for the user on the second system providing the remote resource.

In one or more embodiments, the method or the system stores the user credentials for authenticating or authorizing the user on one or more external systems or domains (hereinafter an external system or external systems) at a central location that is, for example, on the first system or at a location that is accessible by the first system. For example, the method or the system may store these user credentials in one or more databases or other forms of data structures in certain embodiments. The method or the system may further employ encryption and decryption techniques in accessing and transmitting the user credentials to better safeguard the user credentials in certain embodiments.

The method or the system may comprise the process or module for preparing the user for taking over the new session between the first system receiving the user's request to access the remote resource and the second system providing the remote resource at 106 in one or more embodiments. The user may then continue to use the new session to access the desired remote resource upon or after the method or the system completes the automatic logon for the user in certain embodiments. Embodiments and aspects thereof are described with further reference to FIGS. 2-9.

Figure 2:
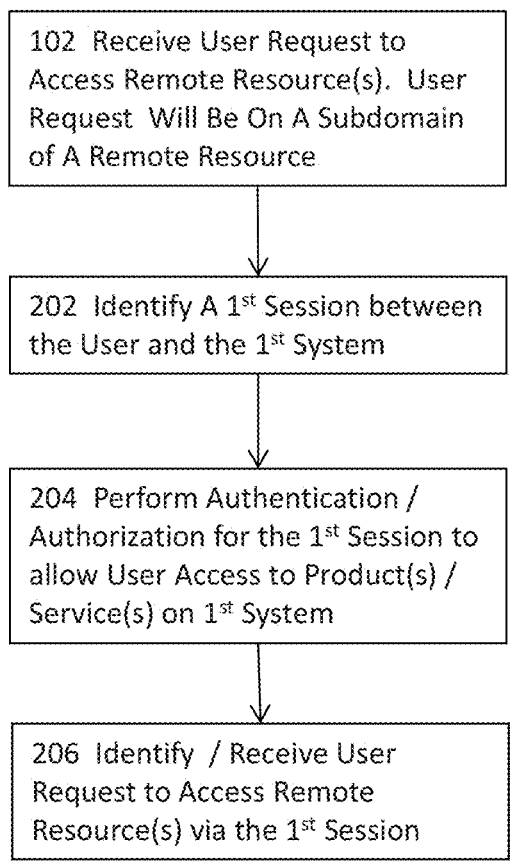
FIG. 2 illustrates more details of a process or module illustrated in FIG. 1 in certain embodiments.

FIG. 2 illustrates further details of a process or module utilized for receiving the user request to access the remote resource according to certain embodiments. In certain embodiments, the process or module for receiving the request comprises the process or module for identifying or creating a first session between the user's system and the first system receiving the user's request at 202. In some embodiments, a session comprise a semi-permanent interactive information interchange, a dialogue, a conversation, or a meeting (hereinafter communication) between two communicating devices or between a user and a computing node.

A session may be stateful such that at least one party to the communication may need to save certain information or data about the session in certain embodiments. A session may comprise an HTTP session utilizing the application layer, a TCP (Transmission Control Protocol) session utilizing the transport layer, or a combination in certain embodiments. A session may be maintained by a process or a program defined by the data or information being exchanged in the communication in certain embodiments. For example, an HTTP (Hypertext Transfer Protocol) session that may be used in certain embodiments between the user and the first system or between the first system and the second system may include one or more HTTP cookies that identifies state that include, for example, the unique session identifier, information about the user's preferences, or the user's authorization level.

A session may comprise a server-side session, a client-side session, or a combination of both in various embodiments. A server in some embodiments may encrypt the information or data for the session before sending the session data in any forms to the recipient. A server may also compress the information or data about the session before creating a cookie and decompress the compressed information or data later when the cookie is returned by the recipient in some embodiments. A server may further generate a unique session identifier (e.g., a session token) and then send it to a recipient to identify the current session for the communication in certain embodiments. In these embodiments, the recipient may store the session identifier with or without other session information or data as an HTTP cookie and send it in subsequent requests. In some embodiments where the recipient only stores the session identifier but not the other session information or data, the server may store such session information or data on the server and link such session information or data to the session identifier.

The process or module for receiving the request may comprise the process or module for performing authentication or authorization for the first session to allow the user to access products or services offered by the first system at 204 in certain embodiments. The products or services may include, for example, an embedded link, a button, an item in a menu, or a pop-up window that links to one or more remote resources hosted by one or more external systems in certain embodiments. The process or module for receiving the request may comprise the process or module for identifying or receiving a user's request to access a remote resource via the first session in some embodiments.

For example, a user may use a browser to visit a Web page presented by the first system. The first system may offer products or services to registered users and thus require proper authentication or authorization of the first user to allow access to the offered products or services. The products or services offered by the first system may comprise, for example, various processes or modules described in this application. Upon proper authentication or authorization, the user clicks on a link embedded in the Web page presented by the first system. The first system receives the user's clicking on the link as the user's request to access a remote resource, wherein the link comprises a subdomain of a second system or a remote resource but is hosted by first system.

Figure 3A:
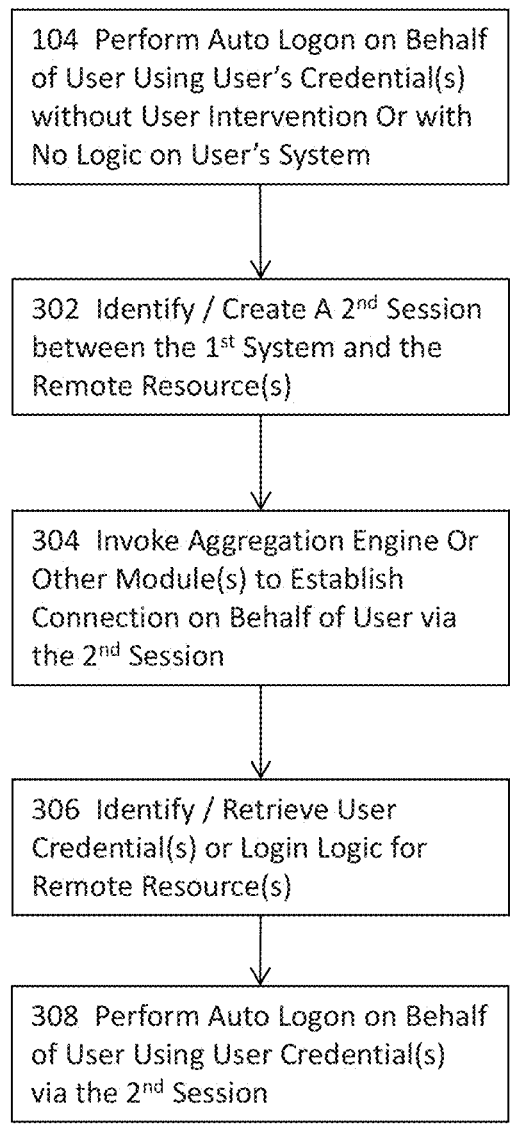

FIG. 3A illustrates more details of a process or module illustrated in FIG. 1 in certain embodiments. More specifically, FIG. 3A illustrates more details about the process or module for performing the automatic logon on behalf of the user. In one or more embodiments, the process or module for performing the automatic logon on behalf of the user comprise identifying or creating a second session between the first system receiving the user's request to access the remote resource and an external system providing or hosting the remote resources at 302.

For example, upon or after receiving the user's request via the first session between the user and the first system to access a remote resource offered by the external system that is external to the first system or to the user's system, the first system may identify or create the second session between the first system and the external system in response to the user's request at 302. It shall be noted that a system may comprise any communicating device such as, but not limited to a computer, a cell phone, a tablet, or any other devices suitable for serving communication or data exchange purposes in some embodiments. At 304, the process or module for performing the automatic logon on behalf of the user may comprise the process or module for invoking or calling the aggregation engine of the first system to establish a connection on behalf of the user via the second session between the first system and the remote system in some embodiments.

At 306, the process or module for performing the automatic logon on behalf of the user may comprise the process or module for identifying or retrieving the appropriate user's credentials or login logic for authenticating or authorizing the user or the second session on the external system in some embodiments. In certain embodiments, the process or module for performing the automatic logon on behalf of the user may identify or retrieve the encrypted or unencrypted user credentials and login logic for the external system from one or more databases or one or more other forms of data structures.

At 308, the process or module for performing the automatic logon on behalf of the user may comprise the process or module for performing the automatic logon for the user on the external system by transmitting the encrypted or unencrypted user credentials from the first system to the external system in certain embodiments. In certain embodiments, the aggregation engine or any module performs the automatic logon by using the login logic that is identified or retrieved at 306. Upon receiving the user credentials, the external system may then invoke its own authentication or authorization processes to authenticate or authorize the second session and allows access to various remote resources according to the level of authorization in certain embodiments. For example, the external system may use its own ad hoc authentication or authorization to authenticate or authorize the second session based on the received user credentials in some embodiments. In one or more embodiments, the module or the process performs the automatic logon on behalf of the user without any intervention from the user.

Figure 3B:
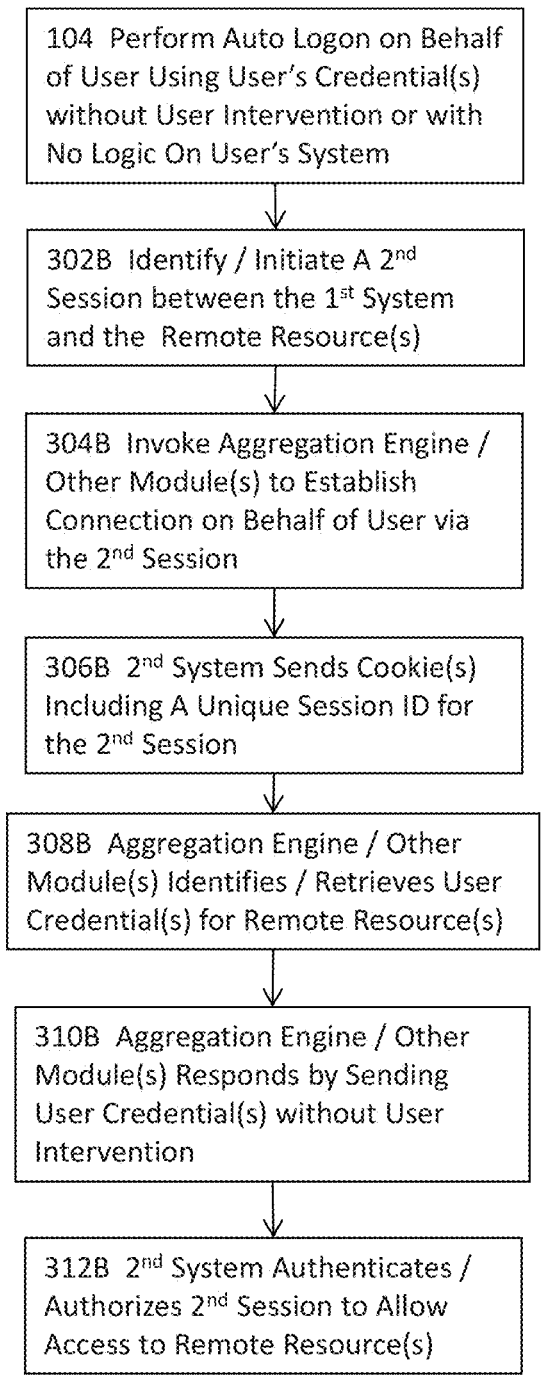
FIG. 3B illustrates more details of a process or module illustrated in FIG. 1 in certain embodiments.

FIG. 3B illustrates more details of a process or module illustrated in FIG. 1 in certain embodiments. More specifically, FIG. 3B illustrates more details about the process or module for performing the automatic logon on behalf of the user in some embodiments. At 302B, the process or module for performing the automatic logon on behalf of the user comprises identifying or initiating a second session between the first system receiving the user's request to access the remote resource and the external system providing or hosting the remote resource in certain embodiments. At 304B, the process or module for performing the automatic logon on behalf of the user comprises invoking the aggregation process or engine to establish the connection between the first system and the external system via the second session in certain embodiments. At 306B, the process or module for performing the automatic logon on behalf of the user comprises the process or module for receiving a cookie (e.g., an HTTP cookie, a Web cookie, a browser cookie) from the external system in certain embodiments.

In certain embodiments, a cookie may be transmitted back and forth between two communicating devices such that at least one of the two communicating devices knows that requests or communications are related to each other. In some embodiments, a cookie may comprise various attributes that include one or more name-values set by a communicating device that generates and sends the cookie in the first place in one or more embodiments. In some embodiments, the various attributes may further comprise a cookie domain and a cookie path. The cookie domain and the cookie path define the scope of the cookie and communicates to the receiving communicating device that the receiving communicating device should send back to the other communicating device for the given cookie domain and cookie path.

In certain embodiments where the initial sending communicating device does not set the cookie domain and the cookie path, the cookie domain and path will be default to the domain and path for the object (e.g., the remote resource) that was requested. In some embodiments, the various attributes may further comprise cookie expiration time or maximum age or one or more flags (e.g., a secure flag or an httponly flag.) In some embodiments, the sending communicating device may further receive user preferences and encode the received user preferences in the cookie. In one or more embodiments, a cookie includes a unique session identifier for the current session between the two communicating devices. In these embodiments, the back and forth transmission of the cookie between the two communicating devices ensures that the communications use the session as identified by the session identifier.

At 308B, the aggregation process or engine identifies or retrieves user credentials for the external system in order to obtain proper authentication or authorization for accessing the remote resource in some embodiments. At 310B, the aggregation engine or any module sends the identified or retrieved user credentials to the external system for authentication or authorization purposes in some embodiments. At 312B, the external system authenticates or authorizes the new session to allow access to the remote resource hosted or provided thereupon based on the proper level of authentication or authorization in some embodiments.

As an illustrative example, the external system may transmit a cookie to the aggregation process or engine when the aggregation process or engine identifies or creates a new session to the external system and performs the automatic logon for the user. The external system may then send a cookie including a unique session identifier for the new session to the aggregation process or engine and ask for authentication or authorization. In response, the aggregation process or engine may transmit the retrieved or identified user credentials together with the cookie. The external system thus knows that the user credentials are related to the previous communications from the aggregation process or engine and uses the user credentials to authenticate or authorize the new session.

Figure 4A:
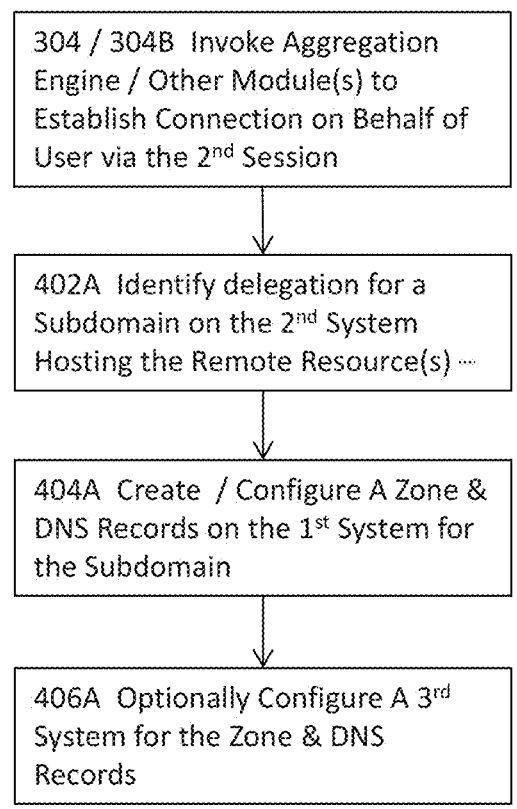
FIG. 4A illustrates more details of a process or module illustrated in FIG. 1 in certain embodiments.

FIG. 4A illustrates more details of a process or module illustrated in FIG. 1 in certain embodiments. More particularly, FIG. 4A illustrates more details about the process or module for invoking the aggregation process or engine to establish connection on behalf of the user via the second session by using subdomain delegation techniques in some embodiments. At 402A, the process or module for invoking the aggregation process or engine to establish connection on behalf of the user via the second session comprises the process or module for creating delegation for a subdomain of a parent domain hosting or providing the remote resource on the external system in one or more embodiments.

At 404A, the process or module for invoking the aggregation process or engine to establish connection on behalf of the user via the second session further comprises creating or configuring a subdomain zone and necessary DNS (domain name server) records on the first system receiving the user's request to access the remote resource in some embodiments. At 406A, the process or module may further optionally comprise the process or module for configuring a third system for the subdomain zone or the DNS records in some embodiments.

Figure 4B:
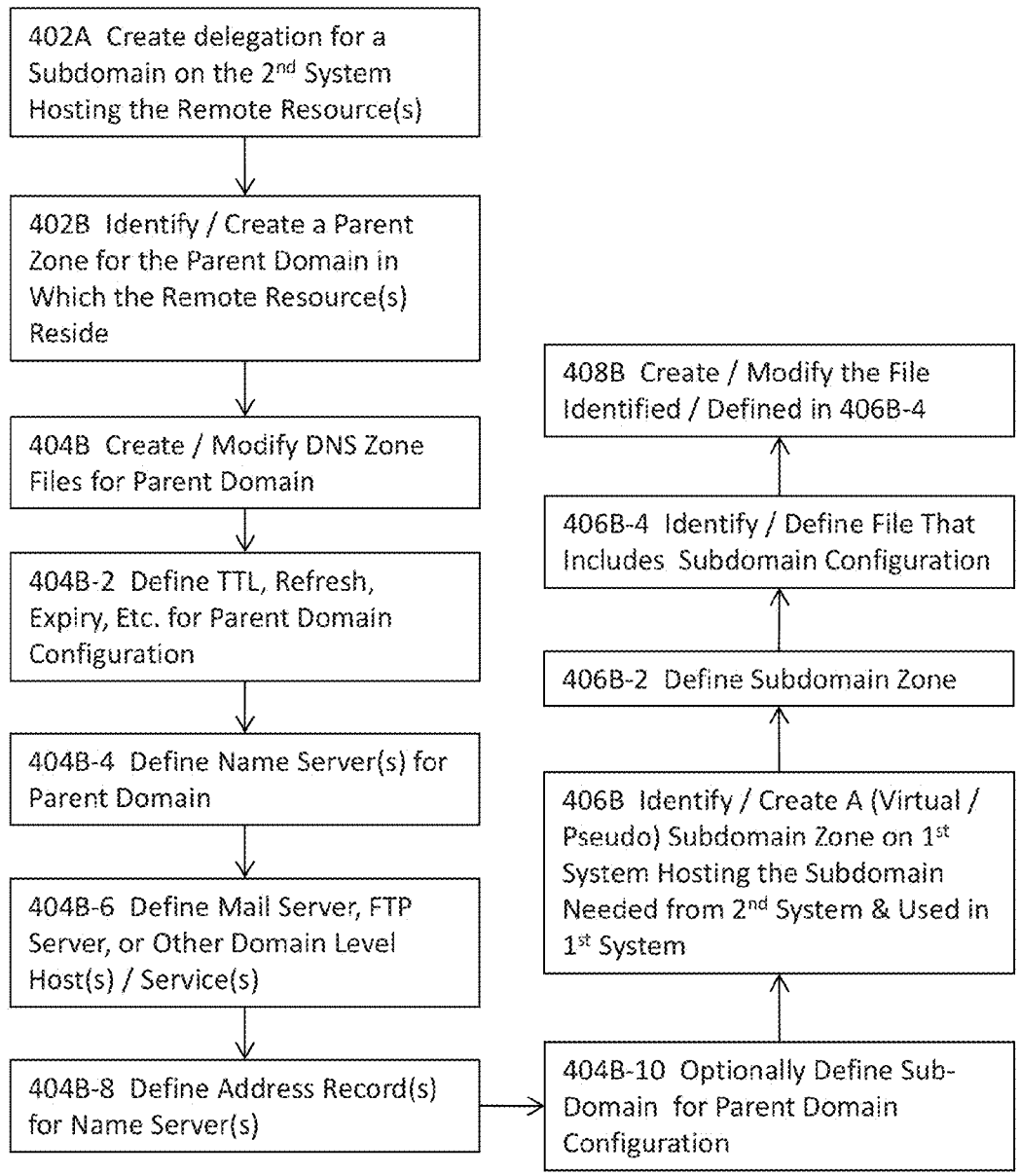
FIG. 4B illustrates more details of a process or module illustrated in FIG. 4A in certain embodiments.

FIG. 4B illustrates more details of a process or module illustrated in FIG. 4A in certain embodiments. More particularly, FIG. 4B illustrates more details about the process or module for creating delegation for a subdomain on the external system that hosts or provides the remote resource in certain embodiments. In one or more embodiments, the process or module for creating delegation for a subdomain on the external system comprises the process or module 402B for identifying or creating a parent zone for the parent domain hosting the remote resource on the external system at 402B. The process or module for creating delegation for a subdomain on the external system further comprises the process or module for creating or modifying one or more DNS zone files for the parent domain at 404B in some embodiments.

More specifically, in certain embodiments, the process or module for creating or modifying the DNS zone files comprises the sub-process or sub-module for defining attributes for the parent domain at 404B-2. The attributes may include one or more of TTL (Time To Live), refresh frequency, expiry, etc. in some embodiments. In some embodiments, the process or module for creating or modifying the DNS zone files comprises the sub-process or sub-module for defining one or more name servers for the parent domain hosting the remote resource that the user desires to access at 404B-4. At 404B-6, the process or module for creating or modifying the DNS zone files may optionally comprise the sub-process or sub-module for defining one or more domain level hosts or services such as the mail server, the FTP server, or other domain level host(s) or service(s) in some embodiments.

In certain embodiments where the name servers are also part of the parent domain, the method or the system may further provide the glue records in one or more zone files in the context of subdomain delegation. A glue record comprises information or data to enable the name server providing the delegation to provide one or more IP addresses for the authoritative name server mentioned in the delegation. For example, if the parent domain is www.externalsystem.com and a name server for www.externalsystem.com is ns1.externalsystem.com, it can be seen that the name server is also part of the parent domain (or a subdomain of the parent domain)—externalsystem.com. When a computing node tries to resolve the parent domain, www.externalsystem.com, the computing node must resolve the name server—ns1.externalsystem.com—first. Nonetheless, there exists a circular dependency because name servers in delegation are identified by names rather than their IP addresses and further because the name server in this case belongs to a subdomain of the parent domain—externalsystem.com. In these embodiments, the method or the system may include the IP addresses for the name server—ns1.externalsystem.com—in the form of a glue records in the DNS zone file to break the circular dependency.

At 404B-8, the process or module for creating or modifying the DNS zone files comprise the sub-process or sub-module for defining the A records or AAAA records (Address records) for the one or more name servers in some embodiments. The A records return a 32-bit IPv4 (Internet Protocol version 4) address that maps a hostname to an IP address, and the AAAA records returns a 128-bit IPv6 (Internet Protocol version 6) address that also maps a hostname to an IP address. The A records may comprise, for example but not limited to, the IP addresses (Internet Protocol addresses) for the one or more name servers for resolving the one or more name servers in some embodiments. In some embodiments, the A records may further comprise glue records. More details about the glue records will be described in subsequent paragraph(s) with reference to respective drawing figure(s).

At 404B-10, the process or module for creating or modifying the DNS zone files comprise the sub-process or sub-module for optionally defining the subdomain of the parent domain in the parent domain DNS zone files in certain embodiments. In one or more embodiments, the sub-process or sub-module for defining the subdomain in the parent domain DNS zone files are substantially to those as described in 404B-2, 404B-4, and/or 404B-6. For example, the sub-process or the sub-module may define TTL, refresh, or expiry for the sub-domain configuration in the parent domain zone files in some embodiments. The sub-process or sub-module may defile one or more name servers and the A records for the one or more name servers for the sub-domain in the parent domain zone files in some embodiments. In some embodiments, the DNS zone files for the parent domain may be constructed to store various resource records in one or more formats such as those defined by RFC 1034 and RFC 1035.

At 406B, the process or module for creating delegation for a subdomain comprise the sub-process or sub-module for identifying or creating a subdomain zone in certain embodiments. In some embodiments, the sub-process or sub-module identifies or creates the subdomain zone on the first system that receives the user request to access the remote resource. In these embodiments, the first system rather than the external system hosting the parent domain may also be configured to host the subdomain. In some embodiments, the sub-process or the sub-module may identify or create a virtual or a pseudo subdomain on the first system. In these embodiments where the sub-process or sub-module identifies or creates a virtual sub-domain zone, the sub-process or the sub-module may define the sub-domain's configurations and the parent zone configuration in a single zone file that comprises a text file describing the sub-domain, a mapping between domain names and IP addresses, and other resource records.

In certain embodiments, the process or module for identifying or creating a subdomain zone may comprise the sub-process or sub-module for defining a subdomain zone at 406B-2. At 406B-4, the process or module for identifying or creating a subdomain zone may comprise the sub-process or sub-module for identifying or defining a zone file including configurations of the subdomain in a substantially similar manner as that described with reference to 404B-2, 404B-4, 404B-6, 404B-8, and 404B-10 in some embodiments. At 408B, the process or module for creating delegation for a subdomain may further comprise the process or module for creating or modifying the DNS zone file that is identified or defined at 406B-4 in some embodiments. In these embodiments, the process or module may modify or create the DNS zone file based at least in part upon which system is hosting the subdomain and the DNS hierarchy of the parent domain of the subdomain by following the substantially similar processes as described with reference to 404B-2, 404B-4, 404B-6, 404B-8, and 404B-10.

Figure 5:
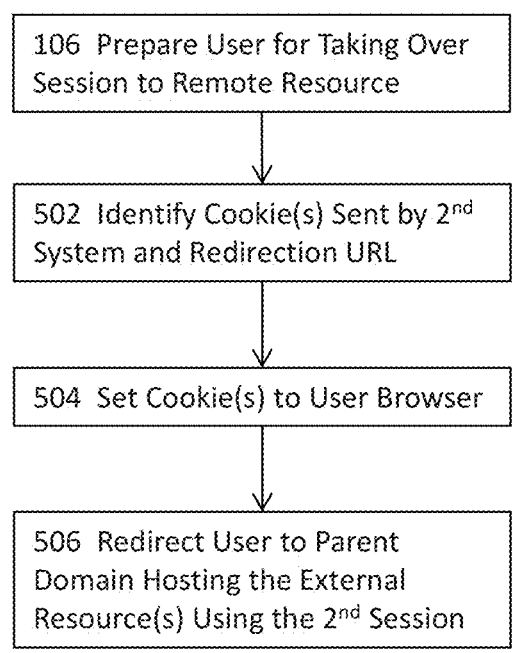
FIG. 5 illustrates more details of a process or module illustrated in FIG. 1 in certain embodiments.

FIG. 5 illustrates more details of a process or module illustrated in FIG. 1 in certain embodiments. More particularly, FIG. 5 illustrates more details about the process or module for preparing the user for taking over the new session between the first system receiving the user request and the external system providing or hosting the remote resource in some embodiments. At 502, the process or module for preparing the user for taking over the new session comprises the process or module for identifying a first cookie that is sent by the external system in some embodiments. In some embodiments, the process or module may further identify the content of the first cookie. For example, the process or the module may identify the unique session identifier for the second session, the cookie domain, the cookie path, and/or one or more value-name pairs from the first cookie in some embodiments. In some embodiments, the process or module for preparing the user for taking over the new session further comprises the process or module for identifying the redirection URL at 502.

For example, a user logs on to the first system and clicks on an embedded link to indicate the user's request to access the remote resource. The user and the first system exchanges communications via the first session between the user and the first system. The user's clicking on the embedded link is directed to a subdomain of the parent domain of the second system, which provides the remote resource, hosted by the first system. By using the aforementioned subdomain delegation techniques, the subdomain is successfully resolved, and the first system hosting the subdomain responds by invoking an application, an API (application programming interface), or a servlet (e.g., a Java servlet) residing on the first system or even on the subdomain to perform the automatic logon for the user so the user may access the remote resource on the external system.

The first system (or the application, the API, or the servlet) performs the automatic logon to the external system on behalf of the user via a second session by using the aggregation process or module. The external system subsequently authenticates and authorizes the second session to access the remote resource based on the stored user credentials transmitted by the aggregation process or module of the first system. It shall be noted that because the embedded link is directed to a subdomain that is hosted on the first system in this example, the process or module for preparing the user for taking over the second session may further comprise the process or module for identifying the URL redirection that may be used to redirect the user's browser to the parent domain that hosts or provides the remote resource the user intends to access.

At 504, the process or module for preparing the user for taking over the new session comprises the process or module for setting a browser cookie to the user's browser in some embodiments. At 504, the process or module for preparing the user for taking over the new session comprises the process or module for redirecting the user to the parent domain so the user continues to use the second session to access the desired remote resource in some embodiments.

As an illustrative example for explaining the aforementioned process in one specific implementation, the process or module may first identify, for example but not limited to, the unique session identifier of the second session, the cookie domain, and the cookie path from the first cookie sent by the external system to the first system in certain embodiments. The process or module for preparing the user for taking over the second session may then set the browser cookie by using the unique session identifier, the cookie domain, the cookie path, and/or the one or more value-name pairs such that when the user takes over the session after the URL redirection, the user browser may return the browser cookie to the external system to enable the external system to recognize that the user's subsequent requests are related to the initial communications for the automatic logon between the aggregation engine and the external system.

Figure 6:
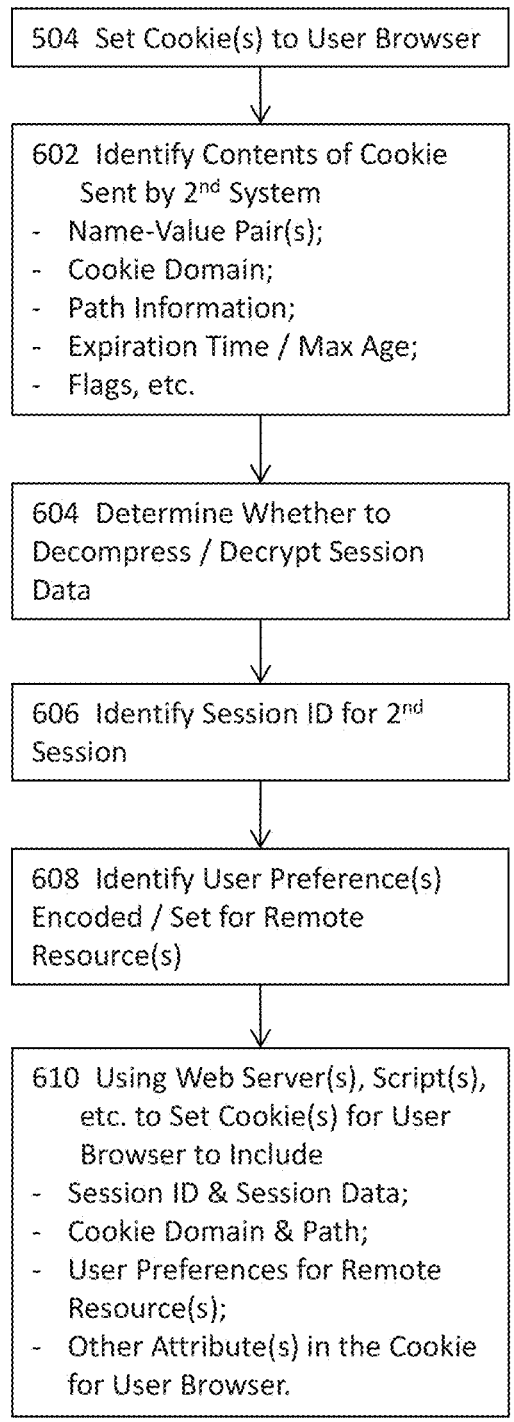
FIG. 6 illustrates more details of a process or module illustrated in FIG. 5 in certain embodiments.

FIG. 6 illustrates more details of a process or module illustrated in FIG. 5 in certain embodiments. More specifically, FIG. 6 illustrates more details about the process or module for setting the browser cookie of FIG. 5 in some embodiments. At 602, the process or module for setting the browser cookie may comprise the process or module for identifying content of the first cookie sent by the external system to the first system in response to the automatic logon process in one or more embodiments. The content of the first cookie may include, for example but not limited to, one or more name-value pairs set by the external system, domain information for the first cookie, path information for the first cookie, expiration time or maximum age, one or more flags such as an httponly flag or a secure flag, a unique session identifier for the second session, other session data, or any other information or data that the external system sets in the first cookie.

At 604, the process or module for setting the browser cookie comprises the process or module for determining whether or not to decrypt session data or other information or data in the cookie in some embodiments. A server may encrypt various information or data before the server creates a cookie and includes such encrypted information or data in the cookie. In response, the process or module may then decrypt the encrypted information or data to identify necessary information or data for setting the browser cookie for the user. The encryption and decryption of information or data may be performed by using various techniques that are known to one of ordinary skill in the art and thus will not be repeated herein.

At 606, the process or module for setting the browser cookie may comprise the process or module for identifying the unique session identifier for the second session between the first system and the external system in some embodiments. At 608, the process or module for setting the browser cookie may optionally comprise the process or module for identifying user preferences at the external system in some embodiments. For example, the user may have visited the external system and set the user's preferences. The external system may then encode these user preferences in the first cookie and sends the first cookie to the first system when the aggregation process or module performs the automatic logon for the user in some embodiments.

At 610, the process or module for setting the browser cookie comprise the process or module for setting the browser cookie for the user to continue to use the second session to access the desired remote resource in certain embodiments. In some embodiments, the process or module may use a Web server, one or more scripts, or any other applications to set the browser cookie for the user. In some embodiments, the browser cookie may include the unique session identifier for the second session, other information or data about the second session, the cookie domain and path, user preferences on the external system, or other attributes.

Figure 7A:
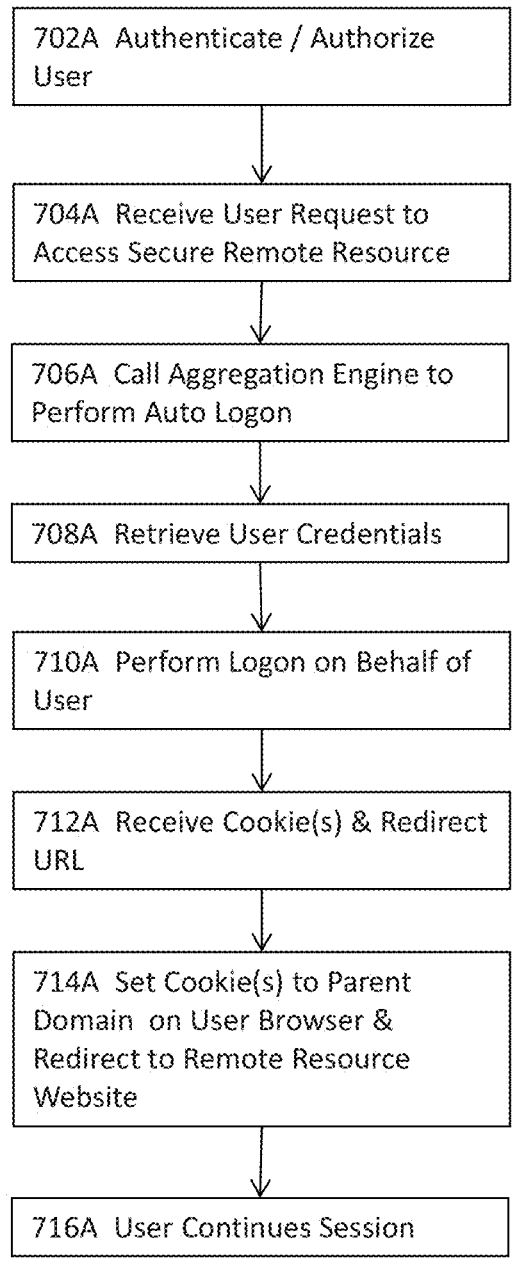
FIG. 7A illustrates a top level flow diagram for a method or system for implementing user access to remote resource in certain embodiments.

FIG. 7A illustrates a top level flow diagram for a method or system for implementing user access to remote resource in certain embodiments. At 702A, the method or the system for implementing user access to remote resource may comprise a process or module for authenticating or authorizing a user on the first system such that the user may access various products or services hosted or provided by the first system via a first session in one or more embodiments. At 704A, the method or the system for implementing user access to remote resource may comprise a process or module for receiving a user request to access a remote resource in some embodiments. In some embodiments, the remote resource is securely hosted or provided by an external system that is external to the first system receiving the user's request.

At 706A, the method or the system for implementing user access to remote resource may comprise a process or module for invoking the aggregation process or module to perform automatic logon on behalf of the user on an external system hosting or providing the remote resource via a new session in certain embodiments. In certain embodiments, the method or the system invokes the aggregation process or module to perform automatic logon for the user by using domain delegation techniques. At 708A, the method or the system for implementing user access to remote resource may comprise a process or module for retrieving the user credentials for satisfying the authentication or authorization process on the external system in some embodiments. The method or the system may further retrieve or identify login logic for communicating with the authentication or authorization process or module of the external system. In some embodiments, the method or the system stores the user credentials at a central, secure location and transmits the user credentials in a secure manner to prevent the user credentials from being compromised without any system change or development effort on the second system.

At 710A, the method or the system for implementing user access to remote resource may comprise a process or module for performing the automatic logon on the external system on behalf of the user by using the aggregation process or module and the user credentials in some embodiments. At 712A, the method or the system for implementing user access to remote resource may comprise a process or module for receiving one or more cookies from the external system in some embodiments. For example, the external system may send a cookie including information or data for the new session when the aggregation process or module initiates the automatic logon with the external system. The first system or the aggregation system may return the user credentials together with the received cookie to the external system such that the external system knows that the user credentials are related to the logon process. On the other hand, the cookie enables the first system or the aggregation process or module to know which session to use to communicate with the external system for the automatic logon, or which domain or path the returned cookie is to be routed to, etc.

At 712A, the method or the system for implementing user access to remote resource may also comprise a process or module for redirecting the URL for the user's browser in some embodiments. At 714A, the method or the system for implementing user access to remote resource may comprise a process or module for setting a browser cookie to the parent domain hosting or providing the remote resource for the user in some embodiments. The method or the system may further comprise the process or module for redirecting the user's browser to the parent domain from the sub-domain that is referred to during the automatic logon in some embodiments. At 716A, the user's browser takes over and continues to use the new session to access the desired remote resource in some embodiments.

Figure 7B:
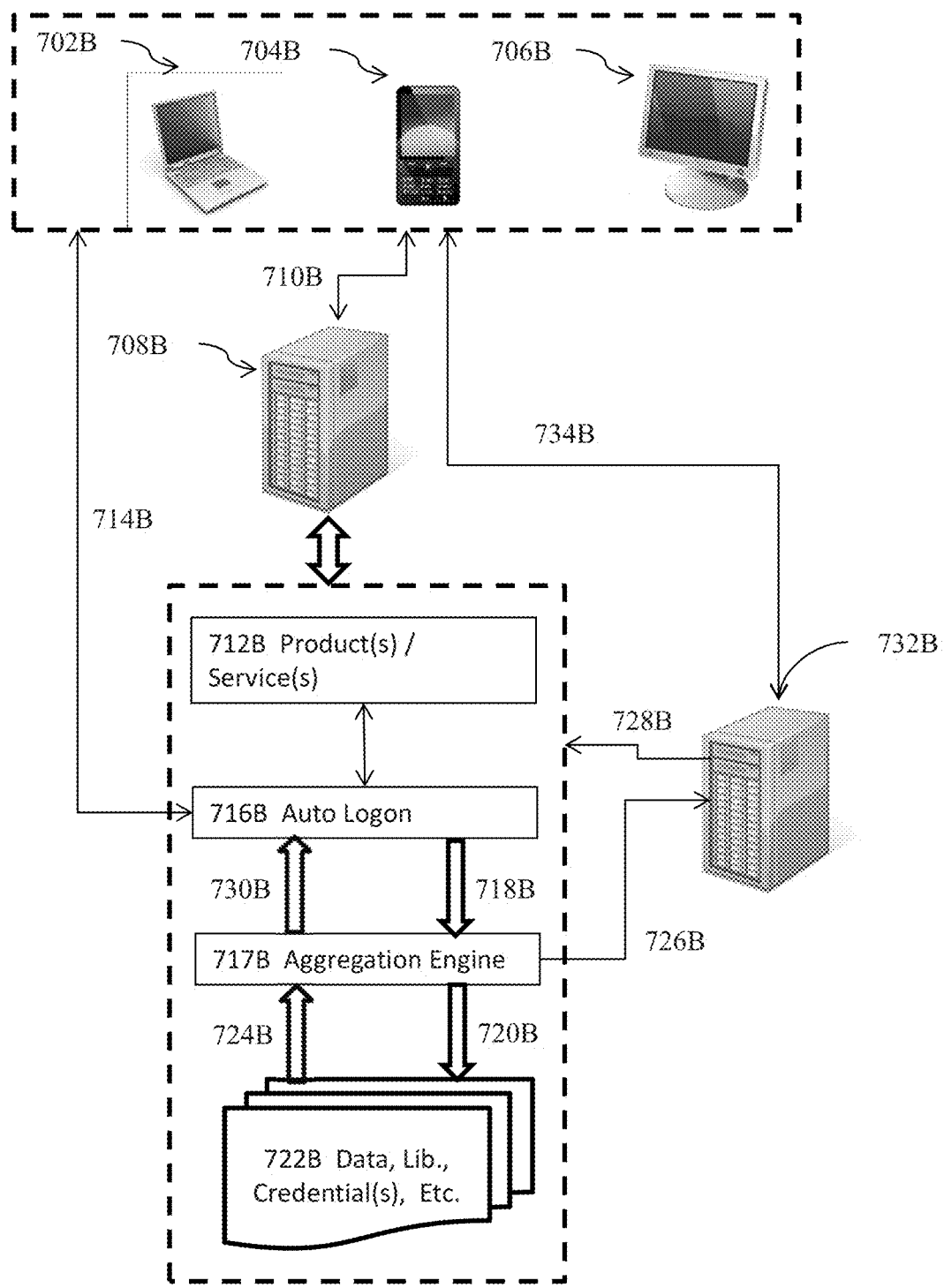
FIG. 7B illustrates a schematic representation of a first system that interacts with one or more users to allow the one or more users to access remote resource on a second system in certain embodiments.

FIG. 7B illustrates a schematic representation of a first system that interacts with one or more users to allow the one or more users to access remote resource on a second system in certain embodiments. FIG. 7 shows that a user using a communicating device such as a laptop computer 702B, a mobile phone 704B, a desktop computer or a terminal 706B, or other communicating device logging onto a first system 708B via a first session 710B of a first network. The first system 708B provides various products or services 712B to registered users such as the user of 702B, 704B, or 706B.

One of the products or services 712B offered by the first system 708B comprises performing various processes to enable the user to access remote resources residing on or provided by an external system 732B. Another product or service 712B offered by the first system 708B includes performing automatic logon on behalf of the user (716B) without any intervention from the user. In this example, the user may send a user request to the first system (714B) to request to access the remote resources on another system such as the external system 732B. The first system is further configured for performing automatic logon 716B on behalf of the user.

For example, the user may send the user request to the first system (714B from the user 702B, 704B, or 706B to the automatic logon 716B) to indicate the user's intent to access the remote resource on the external system 732B by clicking on an embedded link or a button or by selecting an item from a menu. The automatic logon process or module calls (718B) the aggregation engine 717B to perform the automatic logon. The aggregation engine 717B may retrieve (720B) user credentials and the login logic from stored data 722B. The requested user credentials and the login logic are sent (724B) to the aggregation engine 717B which then forwards (726B) to the external system (732B) to perform automatic logon for the user for authentication and authorization via a different session.

The external system may send a cookie (728B) to the first system (e.g., to the aggregation engine) to indicate the different session that is authenticated and authorized to access the remote resource on the external system upon the completion of the automatic logon process. The aggregation engine may forward the cookie and redirection URL to the automatic logon process 730B which may then set the browser cookie and redirect the URL for the user's browser (714B from automatic logon application to the user's communication device) such that the user may take over the different session. Once the browser cookie has been set and the user's browser has been redirected to the URL for the domain hosting the remote resources, the use may communicate with the external system using the different session to access the remote resources on the external system.

Figure 7C:
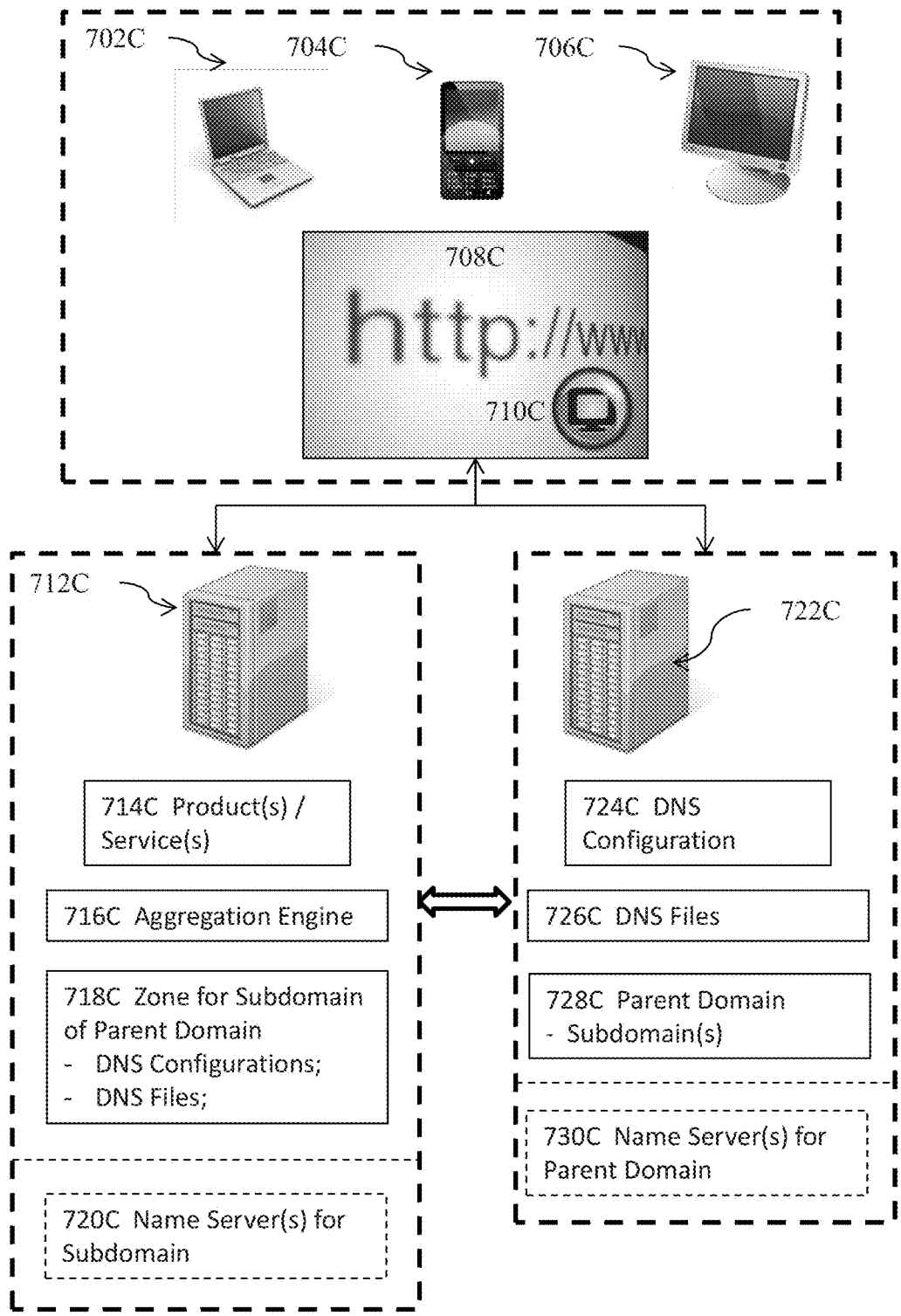
FIG. 7C illustrates a schematic representation of a first system that interacts with one or more users to allow the one or more users to access remote resource on a second system in certain embodiments.

FIG. 7C illustrates a schematic representation of a first system that interacts with one or more users to allow the one or more users to access remote resource on a second system in some embodiments. FIG. 7C shows that a user using a communicating device, such as a laptop computer 702C, a mobile phone 704C, a desktop computer or a terminal 706C, or other communicating device to open a browser window 708C that includes an embedded link, a button, or an item 710C. The user may click on the embedded link or button or select an item (710C) to indicate the user's request to access some remote resources hosted on or provided by an external system 722A.

The user's browser 708C is communicatively connected to a first system 712C to enable the user to log onto the first system to utilize various products or services (714C) hosted on or provided by the first system 712C. The first system includes or is operatively connected to an aggregation engine (716C) that is configured to perform automatic logon on behalf of the user at the external system 722C. The external system 722C is configured to comprise a parent domain (728C) with the appropriate DNS configuration (724C) for the parent domain, the DNS zone files (726C). The parent domain may further include one or more subdomains.

One of the one or more subdomains, subdomain A, will be delegated to the first system 712C for the first system to perform the automatic logon and various other processes for the user to access the remote resources hosted on or provided by the external system 722C. One or more name servers (730C) are configured for the parent domain 728C and also for delegating subdomain A to the first system. The one or more name servers may be in a subdomain of the parent domain or in a separate domain other than the parent domain residing on the external system 722C. Depending upon whether or not the name servers are in one or more subdomains of the parent domain, glue records may be set in the DNS zone files.

The first system may be configured to host the subdomain A of the parent domain residing on the external domain. A zone may need to be created or identified for subdomain A (718C), and the DNS configurations and DNS zone files may need to be defined, created, or modified accordingly. One or more name servers 720C also need to be identified or defined for the subdomain by using the subdomain delegation techniques that have been described in great details in some of the preceding paragraphs with reference to various drawing figures. The name servers for subdomain A may also be a part of the subdomain on the first system 712C, a part of the parent domain on the external system 722C, or completely reside on a separate system other than the first system 712C or the external system 722C. The DNS zone files and the DNS configuration may be updated and glue records may be needed according to where these name servers are located.

Figure 8:
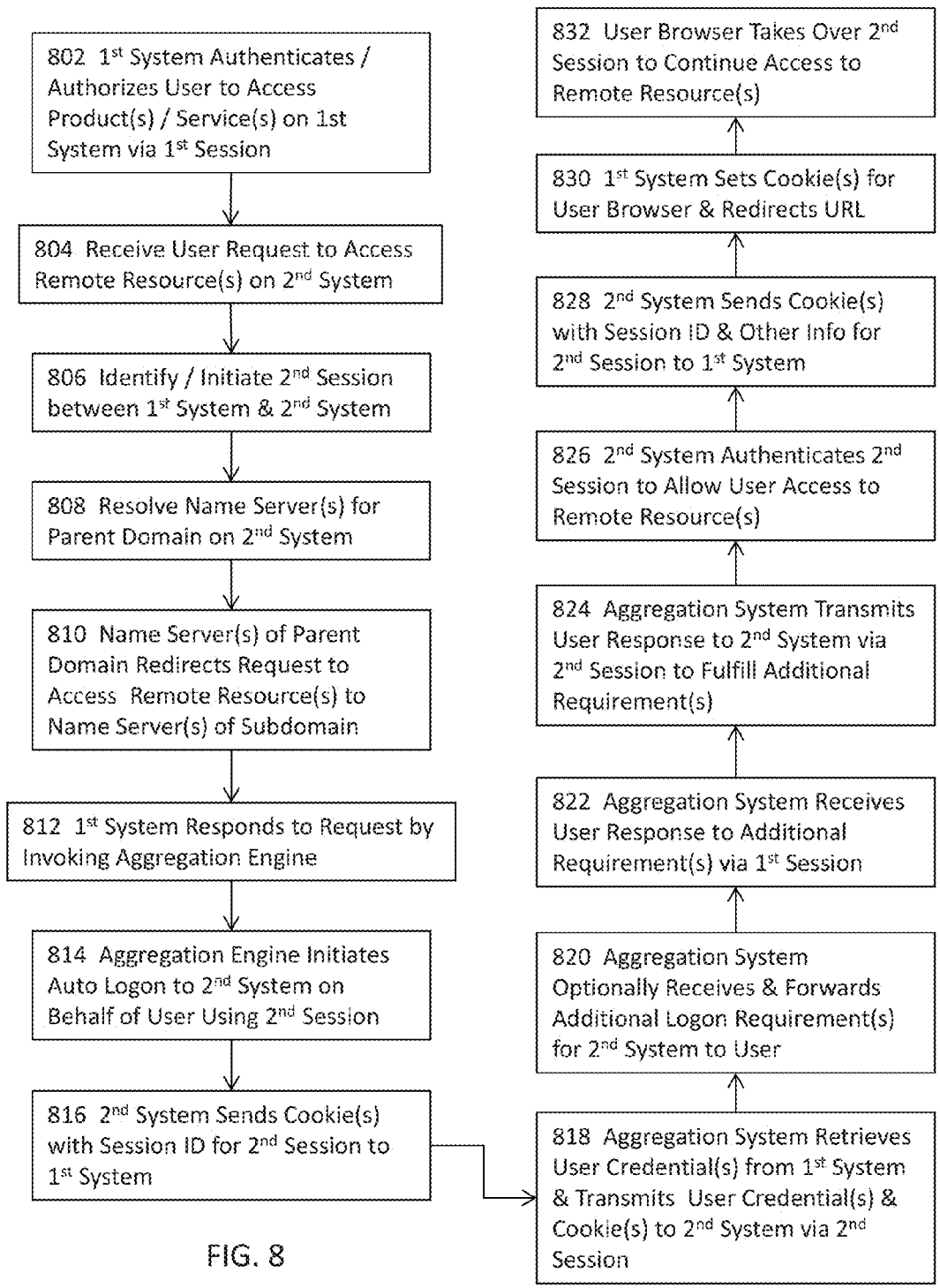
FIG. 8 illustrates a top level flow diagram for a method or system for implementing user access to remote resource in certain embodiments.

FIG. 8 illustrates a top level flow diagram for a method or system for implementing user access to remote resource in certain embodiments. The method or the system comprises the process or module for authenticating or authorizing a user to access products or services on the first system via a first session at 802 in some embodiments. The method or the system may comprise the process or module for receiving a user request to access a remote resource on a second system at 804 in some embodiments. The method or the system may comprise the process or module for identifying or initiating a second session between the first system and the second system at 806 in some embodiments. The method or the system may comprise the process or module for resolving one or more name servers for the parent domain hosting the remote resource on the second system at 808 in some embodiments.

The method or the system may comprise the process or module for redirecting the user request to access the remote resource to one or more name servers of a subdomain of the parent domain at 810 in certain embodiments. The method or the system may comprise the process or module for responding, by the first system, to the user's request by invoking or calling the aggregation process or module at 812 in some embodiments. The method or the system may comprise the process or module for initiating, by the aggregation process or module, the automatic logon to the second system on behalf of the user by using the second session at 814 in some embodiments. The method or the system may comprise the process or module for receiving at the first system a cookie from the second system including a unique session ID for the second session at 816 in some embodiments.

The method or the system may comprise the process or module for retrieving user credentials and sending the retrieved user credentials to the second system via the second session by using the aggregation process or engine at 818 in certain embodiments. The method or the system may optionally comprise the process or module for receiving and forwarding one or more additional authentication or authorization requirements back to the user to properly complete the authentication or authorization process at the second system at 820 in some embodiments. In these embodiments, the method or the system may comprise the process or module for receiving, by the aggregation process or module, the user's input to the request for additional information or data for authentication or authorization at the second system at 822.

The method or the system may comprise the process or module for transmitting the user's input to the second system by using the aggregation process or module at 824 in some embodiments. The second system may then use the user's input transmitted by the first system to complete the authentication or authorization of the user on the second system at 826 to allow the user to access the remote resources hosted on or provided by the second system in some embodiments.

The following example further illustrates these optional processes or modules of 820-824. For example, in addition to the common user name and password, certain authentication or authorization process or module utilizing multi-factor authentication may require additional information or data such as a passcode generated by a security token, some biometric information or data about the user, additional password or identification, etc. If the method or the system determines that such additional information or data may not be reasonably stored on the first system such that the aggregation process or module cannot directly retrieve or identify such additional information or data, the method or the system may forward the requirement for the additional information or data to the user and await the user's feedback to properly complete the authentication or authorization on the second system in some embodiments.

The method or the system may comprise the process or module for receiving a cookie from the second system that includes a unique session identifier or session data for the second session between the first system and the second system at 828 in some embodiments. In the embodiments encompassed by this example, the user is still communicating with the first system via the first session, and the authentication or authorization to use the remote resources hosted on or provided by the second system occurs between the first system and the second system even though it was the user who initially requested for access to the remote resources.

The method or the system may comprise the process or module for setting a browser cookie and providing URL redirection for the user's browser at 830 in some embodiments. The user's browser may then take over the second session according the browser cookie and the redirected URL at 832 in some embodiments. The user may then return the browser cookie to the second system with subsequent requests to the second system, and the second system knows that these subsequent requests are related to the automatic logon and thus allows the user to continue to use the second session to access the remote resources hosted on or provided by the second system.

System Architecture Overview

Figure 9:
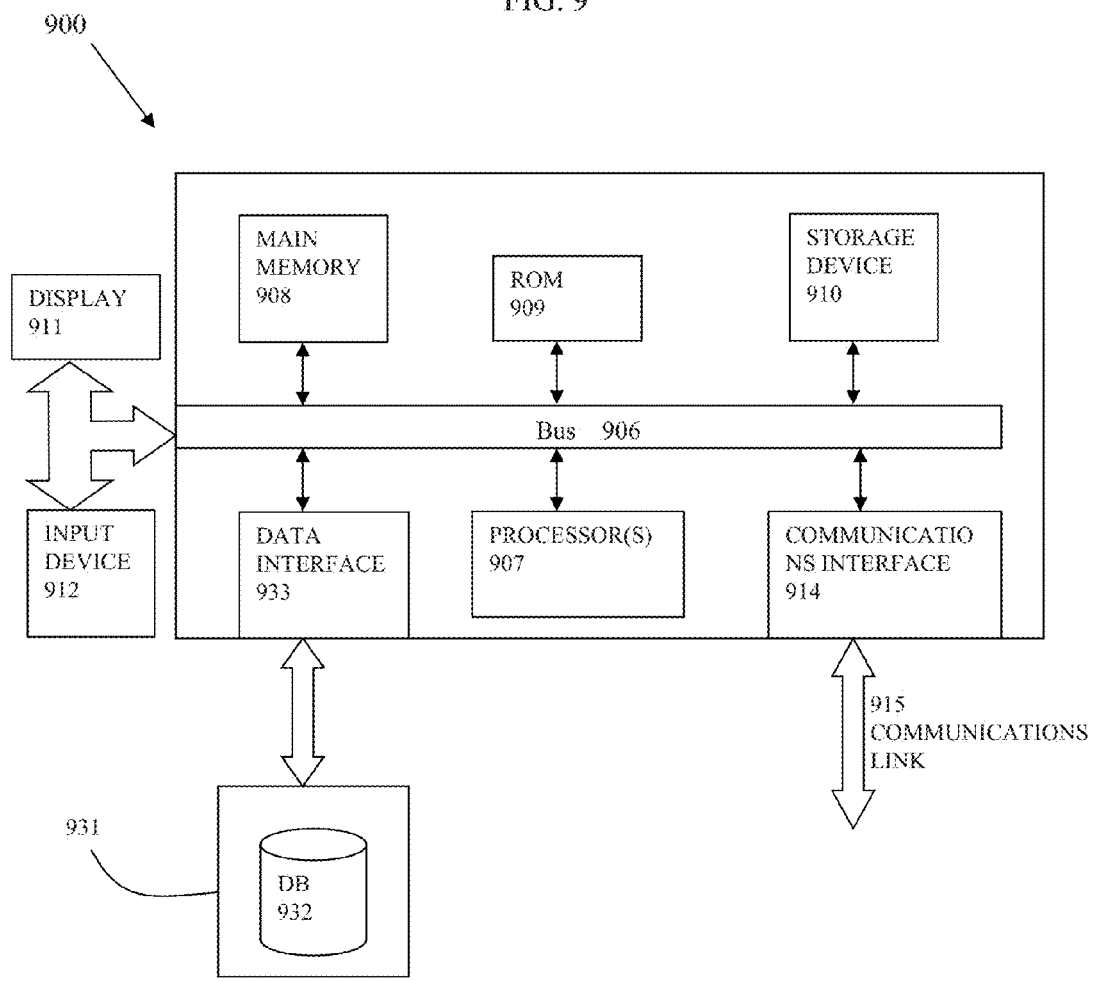
FIG. 9 illustrates a block diagram of an illustrative computing system 700 suitable for implementing various embodiment of the invention

FIG. 9 illustrates a block diagram of components of an illustrative computing system 900 suitable for implementing various embodiment of the invention. For example, the exemplary computing system 900 may be used to implement various processes as described in the preceding paragraphs and the figures such as various processes or modules of determining whether the first post is of interest, various analysis processes or modules, various other determining processes or modules, various processes or modules for performing various actions, etc. as described in the remainder of the Application. Computer system 900 includes a bus 906 or other communication mechanism for communicating information, which interconnects subsystems and devices, such as processor 907, system memory 908 (e.g., RAM), static storage device 909 (e.g., ROM), disk drive 910 (e.g., magnetic or optical), communication interface 914 (e.g., modem or Ethernet card), display 911 (e.g., CRT or LCD), input device 912 (e.g., keyboard), and cursor control (not shown).

According to one embodiment of the invention, computer system 900 performs specific operations by one or more processors or processor cores 907 executing one or more sequences of one or more instructions contained in system memory 908. Such instructions may be read into system memory 908 from another computer readable/usable storage medium, such as static storage device 909 or disk drive 910. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention. In the single embodiment or in some embodiments, the one or more processors or processor cores 907 may be used to perform various actions such as various actions, processes, or modules involving determining, analyzing, performing actions, etc. In certain embodiments, at least one of the one or more processors or processor cores 907 has the multithreading capability.

In one embodiment, the term "logic" shall mean any combination of software or hardware that is used to implement all or part of the invention. In the single embodiment or in certain embodiments, the one or more processors or processor cores 907 may be used to perform various acts such as various acts involving determining, analyzing, performing actions, etc. In certain embodiments, at least one of the one or more processors or processor cores 907 has the multithreading capability to execute a plurality of threads to perform various tasks as described in the preceding sections.

Various actions as described in the preceding paragraphs may be performed by using one or more processors, one or more processor cores, or combination thereof 907. For example, various processes or modules involving the determining action, various analysis processes or modules, etc. may be performed by one or more processors, one or more processor cores, or combination thereof.

The term "computer readable storage medium" or "computer usable storage medium" as used herein refers to any non-transitory medium that participates in providing instructions to processor 907 for execution. Such a medium may take many forms, including but not limited to, non-volatile media and volatile media. Non-volatile media includes, for example, optical or magnetic disks, such as disk drive 910. Volatile media includes dynamic memory, such as system memory 908.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), a magnetic tape, any other magnetic or a magneto-optical medium, CD-ROM, any other optical medium, punch cards, paper tape, any other physical medium with patterns of holes, RAM, PROM, EPROM, FLASH-EPROM, any other memory chip or cartridge, or any other medium from which a computer can read. For example, the various forms of computer readable storage media may be used by the methods or the systems to store either temporarily or permanently information or data such as the one or more master regions, one or more master output layers, one or more global scratch layers, various transforms and inverse transforms, shapes, etc.

In an embodiment of the invention, execution of the sequences of instructions to practice the invention is performed by a single computer system 900. According to other embodiments of the invention, two or more computer systems 900 coupled by communication link 915 (e.g., LAN, PTSN, or wireless network) may perform the sequence of instructions required to practice the invention in coordination with one another.

Computer system 900 may transmit and receive messages, data, and instructions, including program, i.e., application code, through communication link 915 and communication interface 914. Received program code may be executed by processor 907 as it is received, and/or stored in disk drive 910, or other non-volatile storage for later execution. In an embodiment, the computer system 900 operates in conjunction with a data storage system 931, e.g., a data storage system 931 that includes a database 932 that is readily accessible by the computer system 900. The computer system 900 communicates with the data storage system 931 through a data interface 933. A data interface 933, which is coupled to the bus 906, transmits and receives electrical, electromagnetic or optical signals that include data streams representing various types of signal information, e.g., instructions, messages and data. In embodiments of the invention, the functions of the data interface 933 may be performed by the communication interface 914.

In the foregoing specification, embodiments of the invention have been described with reference to the figures. It will, however, be evident that various modifications and changes may be made thereto without departing from the broader spirit and scope of the invention, and that figures and examples provided are not provided to limit the scope of embodiments. Thus, the specification and drawings are, accordingly, to be regarded in an illustrative rather than restrictive sense.

Further, where methods or processes described above indicate certain events occurring in certain order, those of ordinary skill in the art having the benefit of this disclosure would recognize that the ordering may be modified and that such modifications are in accordance with the variations of the invention. Additionally, parts of methods may be performed concurrently in a parallel process when possible, as well as performed sequentially.

Accordingly, embodiments are intended to exemplify alternatives, modifications, and equivalents that may fall within the scope of the claims.

What is claimed is:

1. A computer implemented method for implementing user access to a remote resource, comprising:
   receiving, at a first computer, a request from a user computing device through a first network to access the remote resource, wherein the remote resource resides on a second computer accessible by the first computer through a second network;
   performing, at the first computer, automatic logon for the user using stored user credentials, performing automatic logon comprising:
      identifying or creating a new session between the first computer and the second computer, and
      causing the user to be authenticated or authorized to the second computer via the new session utilizing an aggregation process, causing the user to be authenticated or authorized comprising:
         invoking the aggregation process on the first computer,
         using the aggregation process to retrieve or identify a user credential stored and accessible by the first computer, and
         transmitting the user credential to the second computer for authenticating or authorizing the user on the second computer, wherein the stored user credentials authenticate or authorize the user to access the remote resource on the second computer when the user uses the stored user credentials to separately log onto the second computer, the new session between the first computer and the second computer through the second network is identified or created without using a single-sign-on mechanism in which one or more tickets are passed between the first computer and the second computer to service the remote resource to the user, and authentication of the user on the first computer grants the user access to the remote resource on the second computer; and
   enabling, by the first computer, the user to access the remote resource by using the new session.

2. The computer implemented method of claim 1, in which the action of receiving the request comprises:
   identifying a first session between the user and the first computer;
   allowing the user to access a product or a service on the first computer upon or after authenticating or authorizing the first session; and
   receiving the request from the user via the first session.

3. The computer implemented method of claim 1, in which the action of performing the automatic logon for the user is performed without user intervention.

4. The computer implemented method of claim 1, in which the request from the user to access the remote resource comprises a single click in a user interface on the user's computing device.

5. The computer implemented method of claim 1, in which the action of causing the user to be authenticated or authorized to the second computer further comprises:
   receiving a cookie from the second computer for authenticating or authorizing the user, wherein the action of transmitting the user credential further comprises: sending the cookie with the user credential to the second computer.

6. The computer implemented method of claim 1, in which the action of invoking the aggregation process comprises:
   causing a subdomain delegation for a subdomain of a parent domain to be created on the second computer hosting the remote resource; and
   creating or configuring a zone and domain name server records for the sub domain of the parent domain to direct access to the second computer to the first computer.

7. The computer implemented method of claim 6, in which the sub domain of the parent domain is created or configured on the first computer.

8. The computer implemented method of claim 6, further comprising:
   creating or configuring a third system for the zone and the domain name server records for the sub domain of the parent domain.

9. The computer implemented method of claim 6, in which the action of causing the sub domain delegation for the subdomain of the parent domain to be created on the second computer comprises:
   identifying or creating a parent zone in the second computer hosting the parent domain in which the remote resource reside; and
   creating or modifying a DNS (domain name server) zone file for the parent domain.

10. The computer implemented method of claim 9, in which the action of causing the sub domain delegation for the sub domain of the parent domain to be created on the second computer further comprises:
identifying or creating a sub domain zone on the first computer.

11. The computer implemented method of claim 10, in which the action of identifying or creating the subdomain zone on the first computer comprises:
identifying or creating the subdomain zone on the first computer; and
identifying or generating a subdomain configuration file that includes configurations of the sub domain.

12. The computer implemented method of claim 11, in which the action of causing the sub domain delegation for the sub domain of the parent domain to be created on the second computer further comprises modifying the sub domain configuration file.

13. The computer implemented method of claim 9, in which the action of creating or modifying the DNS (domain name server) zone file for the parent domain comprises:
defining a name server for the parent domain in the DNS zone file; and
defining an address record for the name server in the DNS zone file.

14. The computer implemented method of claim 13, in which the action of creating or modifying the DNS (domain name server) zone file for the parent domain further comprises at least one of:
defining a parent domain level server, host, or service in the DNS zone file; and
defining the sub domain configuration for the parent domain in the DNS zone file.

15. The computer implemented method of claim 1, in which the action of enabling the user to access the remote resource by using the first session comprises:
identifying a URL (uniform resource locator) redirection and a cookie that is received by the first computer from the second computer;
setting a browser cookie for a user browser on a parent domain of the second system; and
redirecting the user browser to a parent domain hosting the remote resource on the second computer via the new session.

16. The computer implemented method of claim 15, in which the action of setting the browser cookie for the user browser comprises:
identifying content of the cookie;
identifying a session identifier for the new session based at least in part upon the content of the cookie; and
generating or modifying the browser cookie by using at least the session identifier.

17. The computer implemented method of claim 16, in which the action of setting the browser cookie for the user browser further comprises:
determining whether or not to decompress or decrypt at least a portion of the content of the cookie, in which the portion comprises at least data of the new session;
identifying user preference from the cookie; and
setting the user preference in the browser cookie.

18. A system for implementing user access to a remote resource, comprising a first computer that communicates with a user through a first network and is configured to at least receive at the first computer, a request from the user through the first network to access the remote resource, wherein the remote resource resides on a second computer accessible by the first computer through a second network,
perform, at the first computer, automatic logon for the user using stored user credentials, which authenticate or authorize the user to access the remote resource on the second computer when the user uses the stored user credentials to separately log onto the second computer, and a new session between the first computer and the second computer through the second network without using a single-sign-on mechanism in which one or more tickets are passed between the first computer and the second computer to service the remote resource to the user, and authentication of the user on the first computer grants the user access to the remote resource on the second computer, and enable, by the first computer, the user to access the remote resource by using the new session, the first computer being further configured to identify or create the new session between the first computer and the second computer, cause the user to be authenticated or authorized to the second computer via the new session by using an aggregation process, invoke the aggregation process on the first computer, use the aggregation process to retrieve or identify a user credential that is stored and accessible by the first computer, transmit the user credential to the second computer for authenticating or authorizing the user on the second computer, cause a sub domain delegation for a sub domain of a parent domain to be created on the second computer hosting the remote resource, wherein the first computer that is configured to cause the subdomain delegation to be created is further configured to: create or configure a zone and domain name server records for the sub domain of the parent domain; and create or configure a third system for the zone and the domain name server records for the sub domain of the parent domain.

19. The system of claim 18, in which the first computer that is configured to receive the request is further configured to identify a first session between the user and the first computer, allow the user to access a product or a service on the first system upon or after authenticating or authorizing the first session, and receive the request from the user via the first session.

20. The system of claim 18, the first computer being further configured for performing the action of causing the user to be authenticated or authorized to the second computer, the action of causing the user to be authenticated or authorized to the second computer further comprising identifying or creating a parent zone in the second computer hosting the parent domain in which the remote resource reside, creating or modifying a DNS (domain name server) zone file for the parent domain, and identifying or creating a sub domain zone on the first computer.

21. The system of claim 18, the first computer being further configured for performing the action of causing the user to be authenticated or authorized to the second computer, the action of causing the user to be authenticated or authorized to the second computer further comprising receiving a cookie from the second computer for authenticating or authorizing the user, wherein the action of transmitting the user credential further comprises sending the cookie with the user credential to the second computer.

22. An article of manufacture comprising a non-transitory computer accessible storage medium having one or more instructions which, when executed by at least one processor, cause the at least one processor to perform a process for implementing user access to a remote resource, the process comprising: receiving, at the first computer, a request from a user through a first network to access the remote resource, wherein the remote resource resides on a second computer accessible by the first computer through a second network, performing, at the first computer, automatic logon for the user using stored user credentials, which authenticate or authorize the user to access the remote resource on the second computer when the user uses the stored user credentials to separately log onto the second computer, and a new session between the first computer and the second computer through the second network without using a single-sign-on mechanism in which one or more tickets are passed between the first computer and the second computer to service the remote resource to the user, and authentication of the user on the first computer grants the user access to the remote resource on the second computer, and enabling, by the first computer, the user to access the remote resource by using the new session, the action of performing the automatic logon for the user further comprising: identifying or creating the new session between the first computer and the second computer, causing the user to be authenticated or authorized to the second computer via the new session by using an aggregation process, invoking the aggregation process on the first computer, using the aggregation process to retrieve or identify a user credential that is stored and accessible by the first computer, transmitting the user credential to the second computer for authenticating or authorizing the user on the second computer, causing a subdomain delegation for a sub domain of a parent domain to be created on the second computer hosting the remote resource, the action of causing the subdomain delegation to be created comprising: creating or configuring a zone and domain name server records for the sub domain of the parent domain, and creating or configuring a third system for the zone and the domain name server records for the subdomain of the parent domain.

23. The article of manufacture of claim 22, the action of receiving the request comprises further comprising: identifying a first session between the user and the first computer, allowing the user to access a product or a service on the first computer upon or after authenticating or authorizing the first session, and receiving the request from the user via the first session.

24. The article of manufacture of claim 22, the action of causing the user to be authenticated or authorized to the second computer further comprising: identifying or creating a parent zone in the second computer hosting the parent domain in which the remote resource reside, creating or modifying a DNS (domain name server) zone file for the parent domain, and identifying or creating a subdomain zone on the first computer.

25. The article of manufacture of claim 22, the action of causing the user to be authenticated or authorized to the second computer further comprising: receiving a cookie from the second computer for authenticating or authorizing the user, wherein the action of transmitting the user credential further comprises sending the cookie with the user credential to the second computer.

* * * * *